United States Patent [19]

Ogasawara

[11] Patent Number: 5,105,382
[45] Date of Patent: Apr. 14, 1992

[54] FRAME TRANSMITTING METHOD OF A TELEMATIC TERMINAL

[75] Inventor: Fumihiro Ogasawara, Yamato, Japan

[73] Assignee: Ricoh Company, Ltd., Tokyo, Japan

[21] Appl. No.: 245,942

[22] Filed: Sep. 19, 1988

Related U.S. Application Data

[63] Continuation of Ser. No. 911,982, Sep. 26, 1986, abandoned.

[30] Foreign Application Priority Data

Sep. 27, 1985 [JP] Japan .................. 60-212230

[51] Int. Cl.⁵ ........................................ G06F 13/00
[52] U.S. Cl. ........................ 395/250; 364/919;
364/919.1; 364/919.2; 364/919.4; 364/926.1;
364/926.2; 364/926.3; 364/926.5; 364/927;
364/2; 364/927.92; 364/927.96; 364/939;
364/939.1; 364/939.3; 364/940; 364/940.61;
364/DIG. 1

[58] Field of Search ... 364/200 MS File, 900 MS File,
364/300; 379/93, 96, 100; 370/99, 100, 105;
358/400, 404, 425, 431, 262.1, 433, 444, 486

[56] References Cited

U.S. PATENT DOCUMENTS

| | | | |
|---|---|---|---|
| 4,370,648 | 1/1983 | Wagner et al. | 340/825.2 |
| 4,377,852 | 3/1983 | Thompson | 364/900 |
| 4,445,193 | 4/1984 | Mueller et al. | 364/900 |
| 4,467,445 | 8/1984 | Mueller et al. | 364/900 |
| 4,499,575 | 2/1985 | Dupuis et al. | 370/58 |
| 4,583,124 | 4/1986 | Tsuji et al. | 358/256 |
| 4,593,323 | 6/1986 | Kanda et al. | 364/900 |
| 4,607,364 | 8/1986 | Neumann et al. | 370/99 |
| 4,611,336 | 9/1986 | Fryer | 375/111 |
| 4,719,514 | 1/1988 | Kurahayashi et al. | 358/261 |
| 4,920,534 | 4/1990 | Adelmann et al. | 370/94.1 |

*Primary Examiner*—Thomas C. Lee
*Assistant Examiner*—Robert B. Harrell
*Attorney, Agent, or Firm*—Oblon, Spivak, McClelland, Maier & Neustadt

[57] ABSTRACT

A frame transmission method for a terminal having system control unit, a reader, a recorder, an operator interface unit, and a communication control unit. The system control unit includes a line memory, which is connected to the reader and the recorder, and a buffer memory, which is connected to a flow buffer provided in the communication control unit, which, in turn, is connected to a transmission line or network. Thus, buffering in transmission of data is provided between the line memory and the buffer memory and also between the buffer memory and the flow buffer. With this structure, the data is transferred to the transmission line in frame format, and the frame transmission condition is varied by detecting the speed of production of data to be transmitted and/or the empty condition of the transmission line depending on the amount of the data to be transmitted accumulated in the flow buffer so as to optimize the transmission efficiency.

3 Claims, 9 Drawing Sheets

FRAME TRANSMITTING METHOD OF A TELEMATIC TERMINAL

This application is a continuation of application Ser. No. 911,982 filed on Sept. 26, 1986, now abandoned.

BACKGROUND OF THE INVENTION

1. Field of the Invention

This invention generally relates to a method of transmitting a frame in a communication network, and, in particular, to a frame transmitting method of a telematic terminal which effects frame construction in image data transmission in a G4 facsimile.

2. Description of the Prior Art

Recently, a research has been carried out on a telematic service (teletex, G4 facsimile, and mix mode machine) terminal, for example, by CCITT, and a control procedure (protocol) or the like for that is being decided. A telematic terminal is a composite terminal serviceable as a teletex terminal, a facsimile terminal, a videotex terminal, or the like. In telematic service, it allows to further improve the image quality and high speed transmission beyond the limits imposed by prior art facsimile machines, including G1, G2 and G3, and a proposal has been made as to a control procedure which allows to carry out communication even between terminals of different types.

SUMMARY OF THE INVENTION

It is therefore a primary object of the present invention to improve the transmission efficiency of such a telematic terminal.

Another object of the present invention is to provide an improved method of transmitting frames in a telematic terminal.

A further object of the present invention is to provide an improved data communication method high in efficiency and speed.

Other objects, advantages and novel features of the present invention will become apparent from the following detailed description of the invention when considered in conjunction with the accompanying drawings.

DESCRIPTION OF THE PREFERRED EMBODIMENTS

It is expected that telematic service will be provided by network systems, such as PSDN (Packet-Switched Public Data Network), CSDN (Circuit-Switched Public Data Network), PSTN (Public Switched Telephone Network) and ISDN (Integrated Services Digital Network). It is likely that ISDN will be the main stream in future. In Japan, INS (Information Network System), which is substantially equivalent to ISDN, is now under experimentation for possible practical use in the near future. In the following, the present invention will be described in the case of G4 facsimile.

Figures 1, 1B:
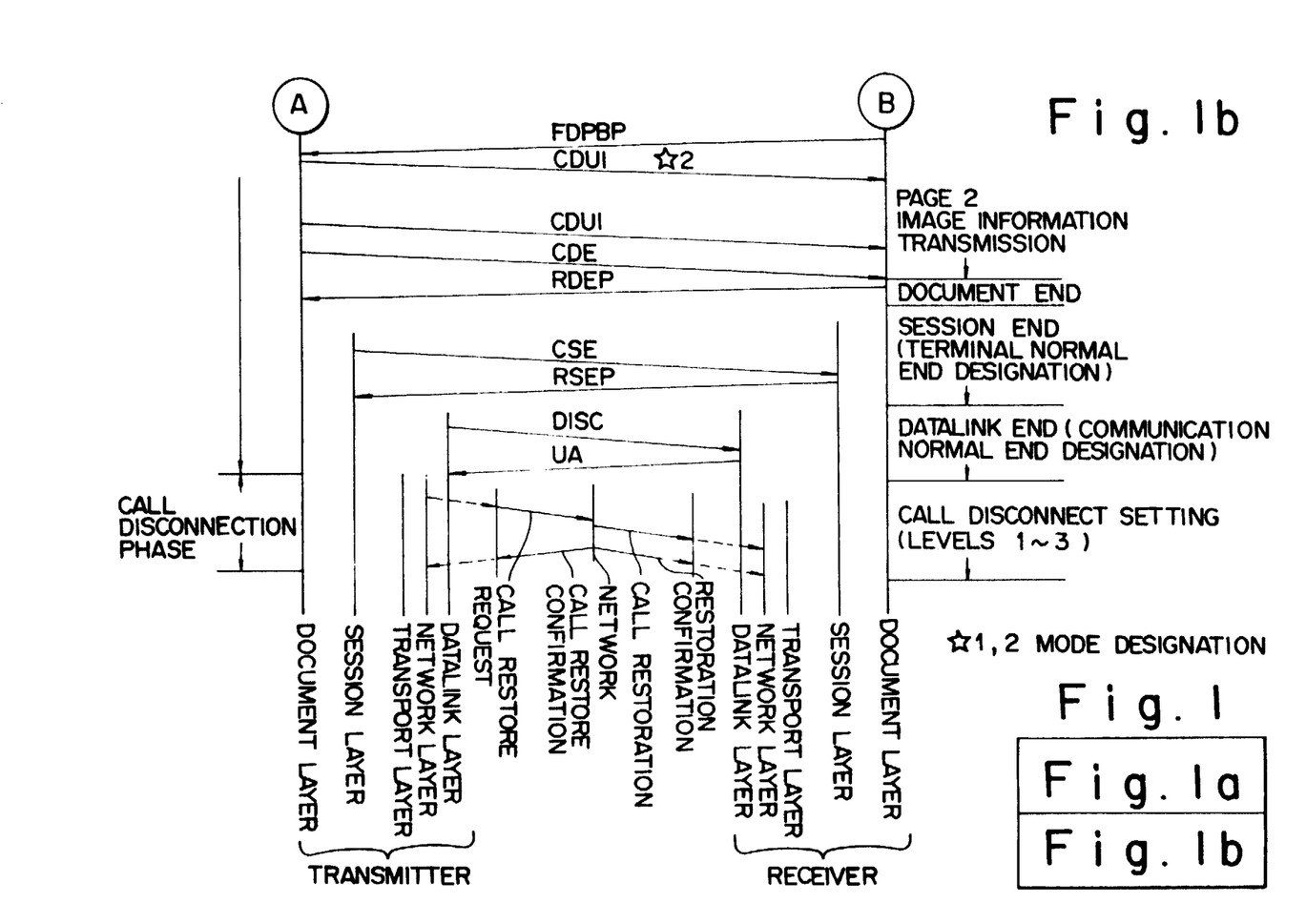
FIG. 1 shows how FIGS. 1a and 1b should be combined.
FIG. 1B shows a second portion of a schematic illustration of a control procedure of G4 facsimile system.

FIG. 1 illustrates the control procedure of G4 facsimile according to the present invention. In G4 facsimile, such networks as CSDN and INS(ISDN) are suitable from the view point of the amount of information, speed, etc. These networks are high in bit rate and error free due to the application of HDLC (High level Data Link Control) as a control procedure, so that they allow to carry out transmission of image data at high speed and high quality, which could not be provided by the prior art telephone network system of G1, G2 and G3. If the network speed is high, the time required for actual transmission of image information and the time required for the preprocedural control prior to the transmission of image information and for the postprocedural control after the transmission of image information play a major role in the efficiency of overall transmission time. In general, in communication, in order to effect transmission efficiently by matching the speed of an input/output device and the speed of the network, use is typically made of buffering at an appropriate location as shown in FIG. 2.

Figure 1A:
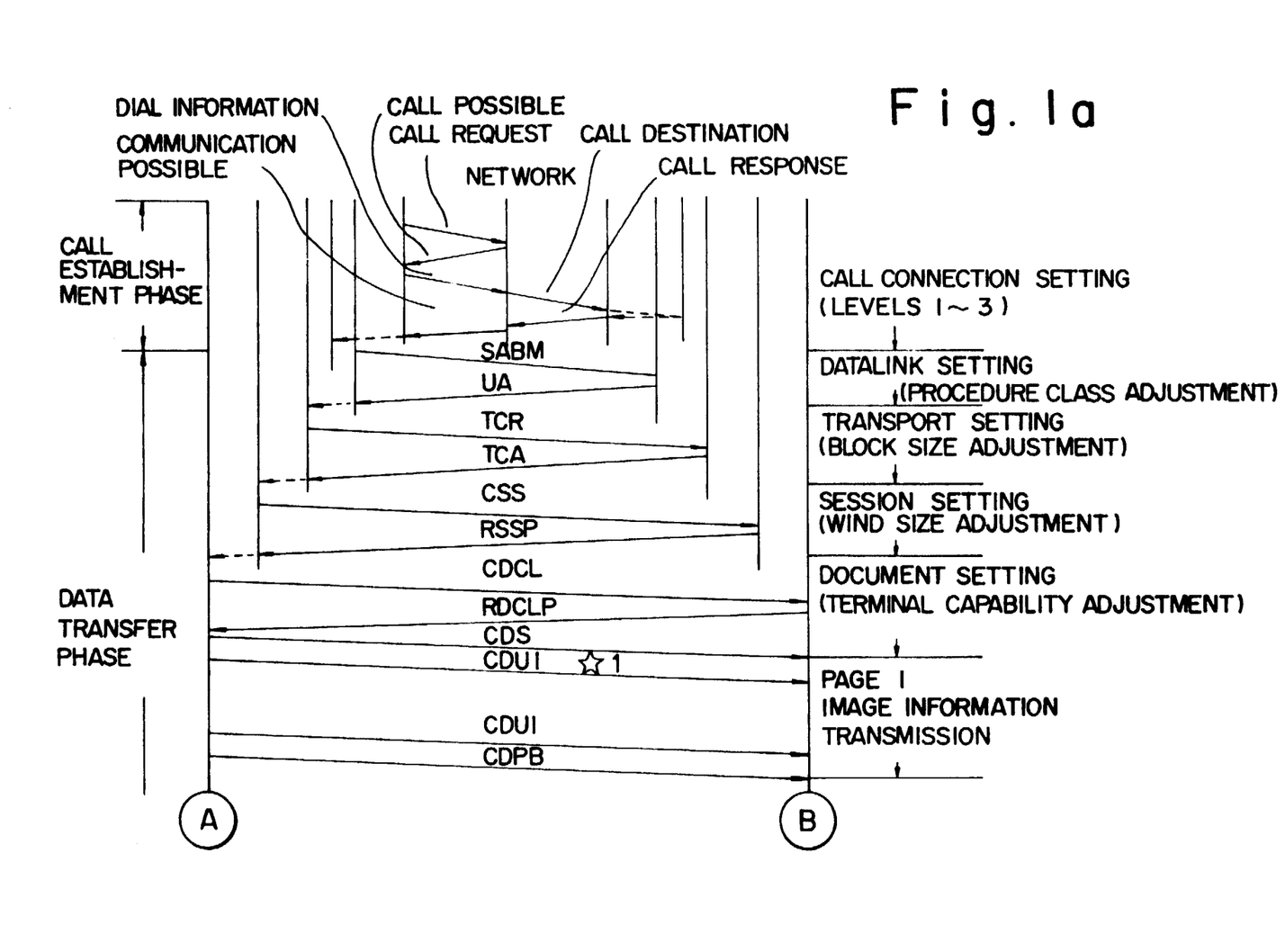
FIG. 1A shows a first portion of a schematic illustration of a control procedure of G4 facsimile system.

It is to be noted that FIGS. 1a and 1b, when combined, illustrate the control procedure for transmitting two pages of image information continuously. It should also be noted that, in general, in communication, if it is desired to increase the use rate of the network, buffering is provided for transmitting data from an input/output device to the transmission line and for a receiving system for receiving data from the transmission line, and such buffering is typically constructed by using a memory or the like.

Figure 2:
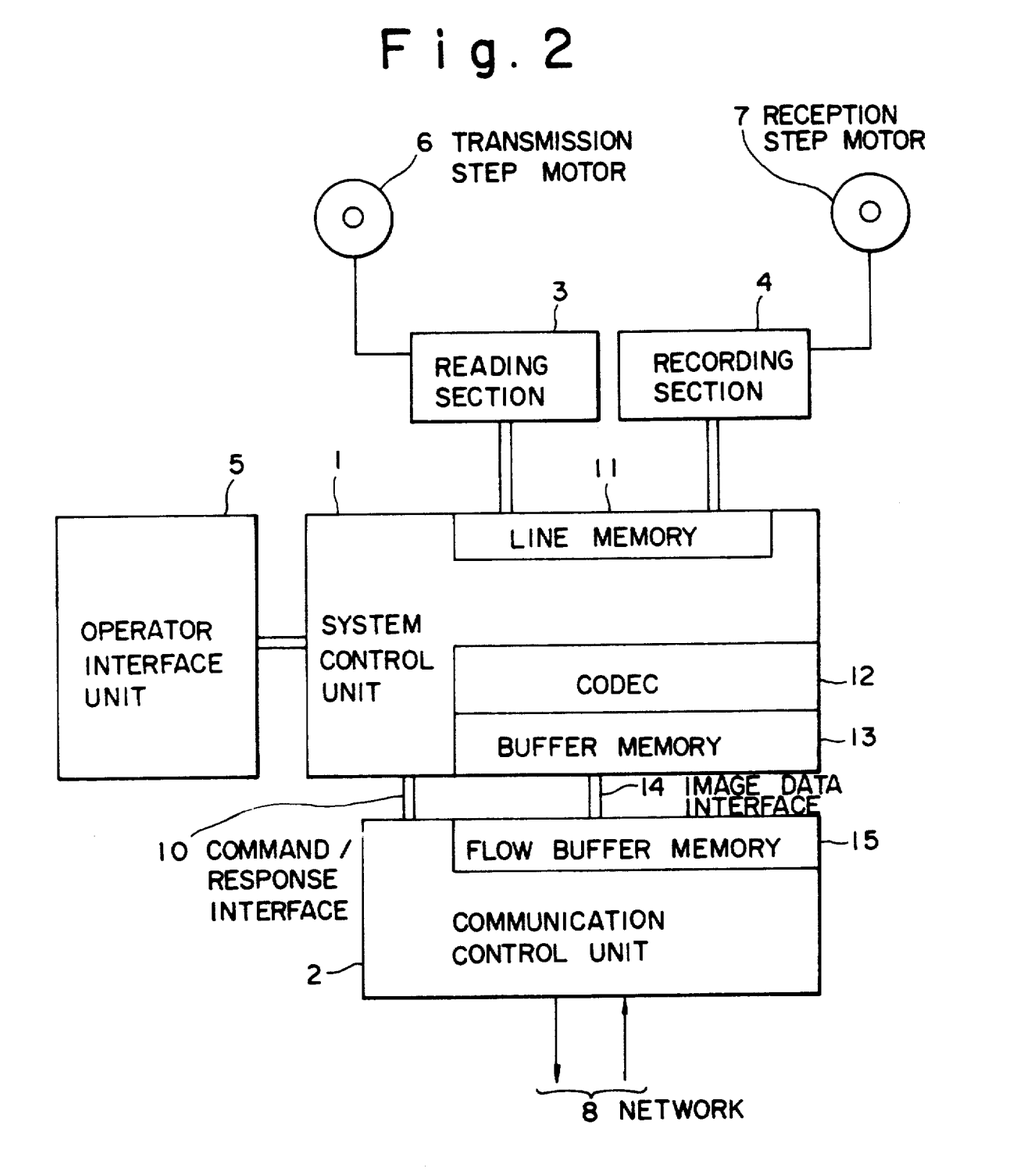
FIG. 2 is a schematic illustration showing the structure of a facsimile terminal constructed in accordance with the present invention.

FIG. 2 schematically illustrates the structure of a facsimile terminal constructed in accordance with one embodiment of the present invention. As shown, the illustrated facsimile terminal includes a system control unit (SCU) 1, a communication control unit (CCU) 2, a reading section (VPU) 3, a recording section (WCU) 4, an operator interface unit (OPU) 5, a transmission step motor 6, a reception step motor 7, a command/response interface 10, a line memory (LM) 11, a coder/decoder (CODEC) 12, a buffer memory (BM) 13, an image data interface 14, and a flow buffer memory (FB) or simply flow buffer 15. The facsimile terminal is connected to a transmission line 8 for transmission and reception of data thereto and therefrom. It is to be noted that, in facsimile, such elements as line memory 11, buffer memory 13 and flow buffer 15 are required.

In the system shown in FIG. 2, the communication control unit 2, reading section 3 and operator interface unit 5 are controlled by the system control unit 1. The system control unit 1 is provided with the coder/decoder or codec 12, which has a coding function for producing coded data by suppressing redundancy from the image information from the reading section 3 and a decoding function for reconstructing the original image information by decoding the coded data upon receipt. According to commands from the system control unit 1, the communication control unit 2 carries out the control procedure for effecting communication with another terminal through the transmission line 8.

The G4 control procedure is a layered procedure which is based on the seven layer OSI model of the ISO standards. Next, the flow of the control procedure for normal transmission and reception of image data will be described with reference to FIGS. 1a and 1b.

(1) Establishment of Call Connection

Typically, using a network system provided by a carrier, such as NTT in Japan, the procedure for establishing a call to an intended terminal is carried out. This is determined depending on the kind of network, such as PSTN, PSDN, CSDN, or ISDN (INS), employed.

(2) Establishment of Data Link Layer

As the data link layer, use is made of the HDLC control procedure recommended by CCITT.
SABM: Set ABM mode.
UA: The connection of link layer is established by Unnumbered Accept.

(3) Establishment of Transport Layer

The transport layer establishes a connection by TCR (Transport Connection Request) and TCA (Transport Connection Accept). Furthermore, at this juncture, negotiation is carried out regarding the data block size between the two terminals, thereby determining the number of octets (number of bytes) of a data block to be used in communication.

(4) Establishment of Session Layer

A connection is established by CSS (Command Session Start) and RSSP (Response Session Start Positive). In addition, at this juncture, negotiation is carried out between the two terminals regarding exchange of ID and abbreviation and the wind size.

(5) Establishment of Document

The establishment of connection of document layer is carried out by CDCL (Command Document Capability List), RDCLP (Response Document Capability List Positive) and CDS (Command Document Start). In the case of CDCL and RDCLP, negotiation is carried out regarding the capability of each of the terminals. And, the start of image information transmission phase is effected by CDS.

(6) Image Information Transmission

Now, a connection is established between the two terminals through the above-described steps (1) through (5), the image information data is transferred to the lower layer with the addition of CDUI (Command Document User Information) HEADER and sent out to the transmission line as image information. (Also at the lower layer, HEADER processing is carried out at each layer.) Now, mode setting for each page is carried out by the first CDUI for page. Incidentally, the first command of page contains parameters (information) of presentation layer, such as a document layout descriptor, a page layout descriptor and text unit. The mode of its document and page (e.g., CODEC mode, line density, etc.) is designated by these information. In addition, CDUI contains therein the length of image data viewed from the presentation layer as a header by the text information which is a parameter of the text unit of the presentation layer other than the image data.

TRANSMISSION

The image data from the reading section 3 enters the line memory 11 and it is stored into the buffer memory 13 after having been encoded by the codec 12. The data of the buffer memory 13 is sent to the communication control unit 2 and stored in the flow buffer 15 of the communication control unit 2. With this, at the communication control unit 2, the encoded data having entered the flow buffer 15 is transferred to the presentation layer and sent out to the transmission line 8 after having been subjected to header processing. During transmission, buffering between the reading speed and coding/decoding speed is effected between the line memory 11 and the buffer memory 13. On the other hand, buffering between the speed of codec 12 and the speed of the transmission line 8 is effected between the buffer memory 13 and the flow buffer 15. The flow buffer 15 carries out matching of speed with the transmission line 8, and it is used for transmitting an image signal efficiently without interruption.

RECEPTION

The data received from the transmission line 8 is processed at each layer within the communication control unit 2 so as to remove its header, and it is stored into the flow buffer 15 as encoded data. The encoded data within the flow buffer 15 is transferred to the buffer memory 13 and then it is transferred to the line memory 11 as being decoded by the codec 12. The data is then transferred to the recoding section 4 so that recoding of an image is effected. During reception, buffering between the speed of the transmission line 8 and the speed of the codec 12 is effected between the flow buffer 15 and the buffer memory 13. And, buffering between the recoding speed and the speed of the codec 12 is effected between the line memory 11 and the buffer memory 13.

(7) Page Boundary and Document End

During step (6), if there is another original to send upon completion of transmission of the first page, page end is apprised to the receiver by CDPB (Command Document Page Boundary). On the other hand, if the current page, which has been just transmitted, is the last page, then document end is apprised to the receiver by CDE (Command Document End). In response thereto, the receiver sends RDPBP (Response Document Page Boundary Positive) for CDPB and RDEP (Response Document End Positive) for CDE. In these command/responses (hereinafter, also referred to as C/R), a parameter of page number is added, which may be used for page management and communication management by the window size which has been negotiated at the session connection. The above-described response is a positive response. If there is any page which has not been properly received, then use is made of a negative response of RDPBN (Response Document Page Boundary Negative). With CDE and RDEP, the end of document layer connection is effected.

(8) Session End

The end of session connection is effected using CSE (Command Session End) and RSEP (Response Session End Positive). The end of transport layer is at the same time as the end of session layer.

(9) Link Layer End

The connection of link layer is released by DISC (Disconnect) and UA (Unnumbered Accept).

(10) Establishment of Call Disconnection

Upon completion of one communication, the call of the transmission line in hold is released. Similarly with the step (1), this procedure is determined depending on the kind of network used.

As described in step (7), at the page boundary containing a document end, the transmitter transmits a CDPB command to the receiver and waits for a response to RDPBP. Besides, in this case, the negotiation has been carried out with the window size equal to 2 or more, and if the unconfirmed number of pages which have already been sent is smaller than the window size, the transmission of the following page is initiated.

Now, a description will be had as to the timing of returning a response for CDPB/CDE. The sooner the transmission of a response to CDPB/CDE, the less the inactive holding time period of the transmission line. That is, from the viewpoint of reducing the transmission time period, the sooner a response to a command, the better. In the case of facsimile or the like, since an output is effected by hard copy, the point in time when a recording medium has been discharged properly is a desired point as the timing for sending a response. However, as shown in FIG. 2, due to buffering among the line memory 11, buffer memory 13 and flow buffer 15, there still remains a significant amount of data which has yet been decoded and supplied for recording at the time of reception of CDPB/CDE. It is to be noted that discharging of a recording medium takes some time because of involvement of mechanical control.

Under the condition, in order to reduce the invalid time period, the window size is set to be equal to or larger than 2. And, the timing of sending a response is set at the time of reception of CDPB and CDE. It is to be noted, however, that the setting of the window size being equal to or larger than 2 is effective in the case of continuous or multiple transmission, but it is not effective in the case of single transmission. Thus, it is most efficient in shortening the transmission time period if a response is sent immediately upon receipt of CDPB/CDE. If a response is sent immediately upon receipt of a command, there still remains data in such elements as flow buffer 15, buffer memory 13 and line memory 11, as set forth previously. For this reason, after sending of a positive response (RDPBP/RDEP), a further decoding operation is carried out to effect recording and discharging of a recorded image. As a result, there is a risk of occurrence of inconveniences, such as generation of decoding error, overheating of a recording head, and jamming of recording medium. However, regarding decoding error, it is taken care of by the error free function provided by the HDLC procedure, and jamming of recording paper may also be minimized in the number of occurrences by simplification in the design of a mechanical system, so that these two factors do not present appreciable problems.

The image data from a transmitting terminal is transmitted to a receiving terminal as in the following manner. The table below shows the steps in this case in detail, and the present invention relates to TX3 indicated in the table.

TABLE

| Transmitter | Receiver |
|---|---|
| Tx1 Reading ↓ | Rx1 Recording ↑ |
| Tx2 Encoding ↓ | Rx2 Decoding ↑ |
| Tx3 Frame Processing | Rx3 Frame Processing |
| -1 Add Presentation Layer Length Header. | -1 Reverse of the Process Indicated in the left. |
| -2 Add Document Control Header. | -2 Reverse of the Process Indicated in the left. |
| -3 Add Session Control Header. | -3 Reverse of the Process Indicated in the left. |
| -4 Add Transport Layer Header. | -4 Reverse of the Process Indicated in the left. |
| -5 Add Network Layer Header | -5 Reverse of the Process Indicated in the left. |
| -6 Add Link Layer Header ↓ | -6 Reverse of the Process Indicated in the left. ↑ |
| Output to Transmission Line → | Input from Transmission Line |

The encoded image data is once stored into the buffer memory 13 and the flow buffer 15 shown in FIG. 2; in this case, however, the amount of data accumulated varies depending on the reading speed (hereinafter, also simply referred to as I speed), encoding speed of codec 12 and the speed of transmitting the image data to the transmission line 8. For example, due to some reason at the receiving terminal, e.g., the recoding speed at the receiving terminal being slower, if the flow buffer 15 and buffer memory 13 of the receiving terminal approaches the condition that they are fully filled with the received data and thus the data from the transmitting terminal cannot be received anymore in succession (this condition being referred to as busy state), a signal RNR (Receive Not Ready) or the like of the link layer may be sent to the transmitting terminal to temporarily halt the transmission of image data (I frame). This is referred to as flow control. (a) In this case, the buffer memory 13 and the flow buffer 15 gradually increase the amount of accumulation of image data. (b) On the other hand, in the case where the I speed and the speed of the code are slower, image data will not be increasingly accumulated in the buffer memory 13 and the flow buffer 15.

In the above-described case (a), it is so structured that the image data so far accumulated in the flow buffer 15 is output in one lot at the time when the busy state is released next time.

In this case, it becomes often to carry out transmission with the size of image data equal to or larger than the block size set at the transport connection, so that frame division takes place at the transport layer.

In this case, the ratio of the byte number of header to the image data byte number becomes smaller, so that the transmission efficiency increases. That is, for the image data to be transmitted in a lot, the presentation layer header (the length of text information), documentation control header and session control header are added only once for the I frame total to be divided, and, thus, the transmission efficiency increases.

The above-described case (a) also arises at the time, other than the busy state, when data increasingly accumulates in the flow buffer 15 because the encoding speed during the transmission of the previous frame is slower.

In the above-described case (b), it is so structured that the data is sent out as soon as it has been introduced into the flow buffer 15. In this case, the overhead due to addition of header becomes larger relative to the image data byte number; however, the time fill between I frames becomes smaller, so that the transmission efficiency is improved on a page-by-page basis. For example, the efficiency is particularly vivid in such a page as an all white original which is less in the number of encoded bits.

In view of the above, in accordance with the present invention, there is proposed a method of transmitting image data at high efficiency by monitoring the condition of a buffer. Now, a preferred embodiment of the present invention will be described below.

Figure 3:
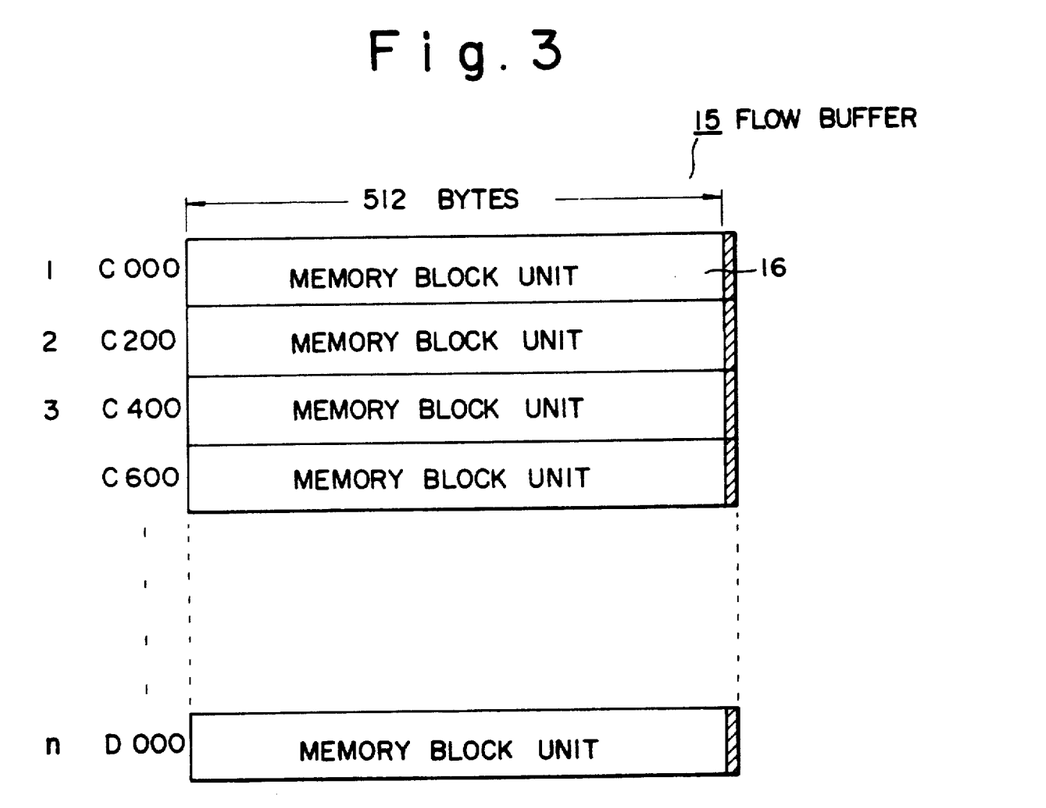
FIG. 3 is a schematic illustration showing the structure of the flow buffer 15 employed in the facsimile terminal shown in FIG. 2.

FIG. 3 schematically shows the structure of the flow buffer 15 employed in the system shown in FIG. 2 constructed in accordance with one embodiment of the present invention. As shown, the illustrated flow buffer is structured by using a plurality of memory block units. It is assumed here that each of the memory block units is comprised of 512 bytes. In the illustrated embodiment, there are provided n number of memory block units 16, and the image data from the buffer memory 13 is stored into the memory block unit 16. Regarding the function of the flow buffer 15, in the present embodiment, during transmission, the image data to the memory block unit 16 is stored in the format adaptable to the frame condition of the transmission line 8. During reception, on the other hand, unnecessary headers are removed from the frame structure of the transmission line and thus the data is stored in the format suitable for decoding with ease. In the case where the image data is too large for a single memory block unit 16, it is partly stored in the following memory block unit. In this case, the address of the linked following memory block unit is stored in the address of the last address of the memory block unit.

Regarding the start address for storing data in the memory block unit 16, storing of image data is initiated from the address having a certain offset, securing areas such as:

presentation text information header;
document control header;
session control header; and
transport layer header.

This is because it is so structured that an I frame can be formed immediately and transmitted to the transmission line from this memory block unit. In this manner, the image data stored in the memory block unit is sent out as soon as the condition to transmit to the transmission line is satisfied. In practice, this is the time when the lower layer as viewed from the presentation layer in the table shown above has become possible to transmit a frame.

In the above-described case (a), the memory block units 16 are linked and image data is being increasingly accumulated. In the present case, since the memory block units 16 are limited in number, when they have become full, no more image data is transferred from the buffer memory 13, so that the buffer memory 13, in turn, approaches its full condition. When filled up, then the line memory 11 also approaches to its full condition. And, when the line memory 11 has become full, the image reading operation is temporarily halted. It is to be noted that this is an extreme condition which takes place only when the receiving terminal has stayed in busy state for an extended period of time for some reason. The image data stored in the linked memory block units 16 is sent out in the format of memory block units linked to the lower layer in response to a designation of the next frame transmission possible from the lower layer.

In the above-described case (b), use is made of only one memory block unit 16 in transmission data to the lower layer. In this case, there is an instance in which one memory block unit 16 is entirely filled with image data and there is another instance in which the memory block unit 16 is only partly filled with image data.

So far, the operation of the flow buffer 15 using a plurality of memory block units 16 has been described. Now, a description will be had regarding the image data transmission flow depending on the condition in which the memory block units 16 are linked or not linked.

Figure 4:
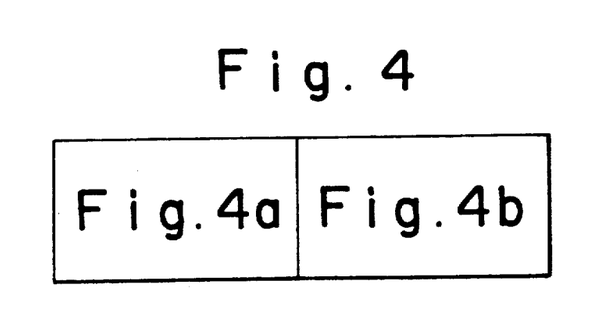
FIG. 4 shows how FIGS. 4a and 4b should be combined.
Figure 4A:
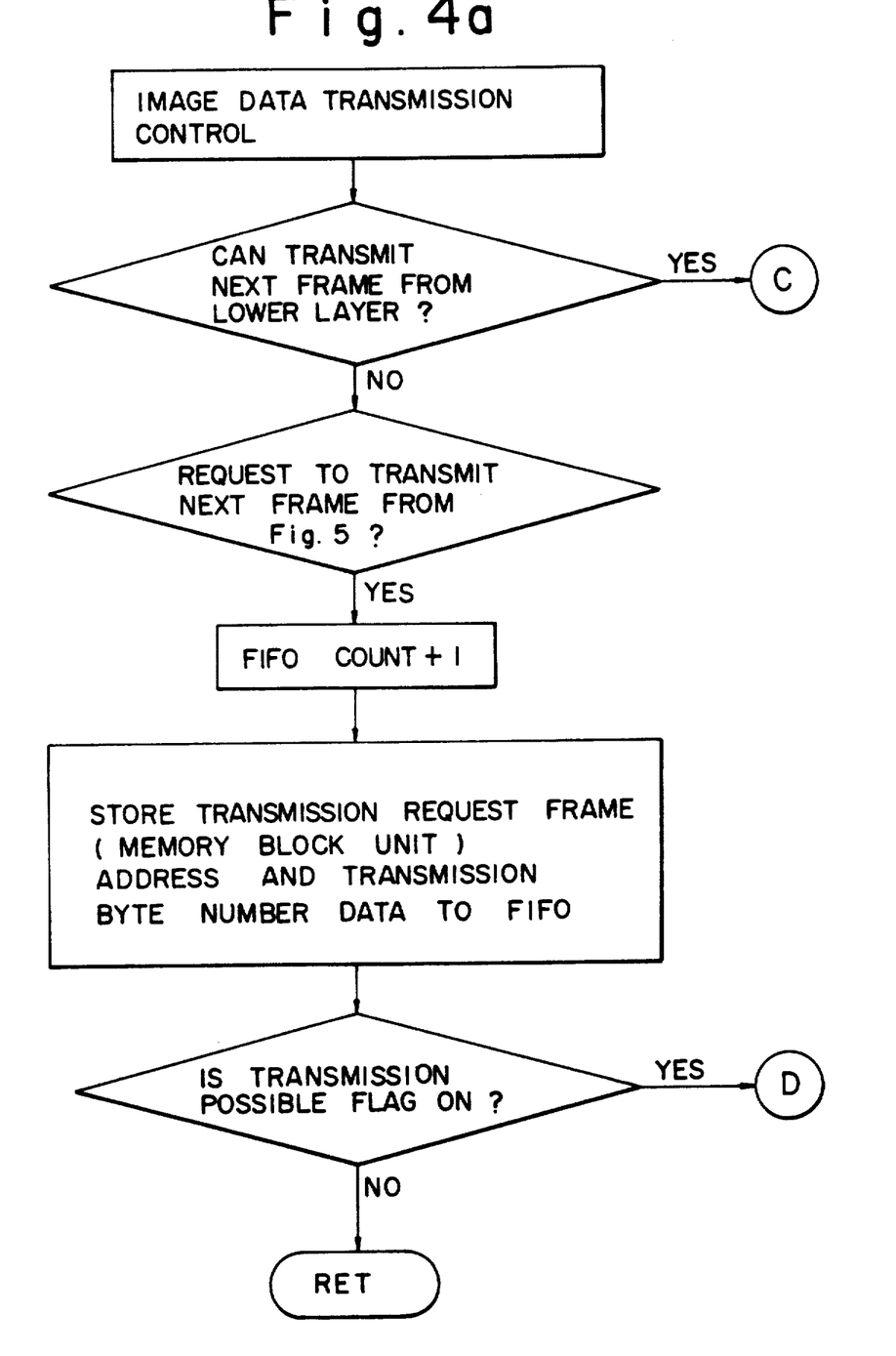
FIG. 4A shows a first portion of a flow chart illustrating in detail the steps in the image data transmission control flow for the Tx 3-1 portion which will be indicated later in the specification.
Figure 4B:
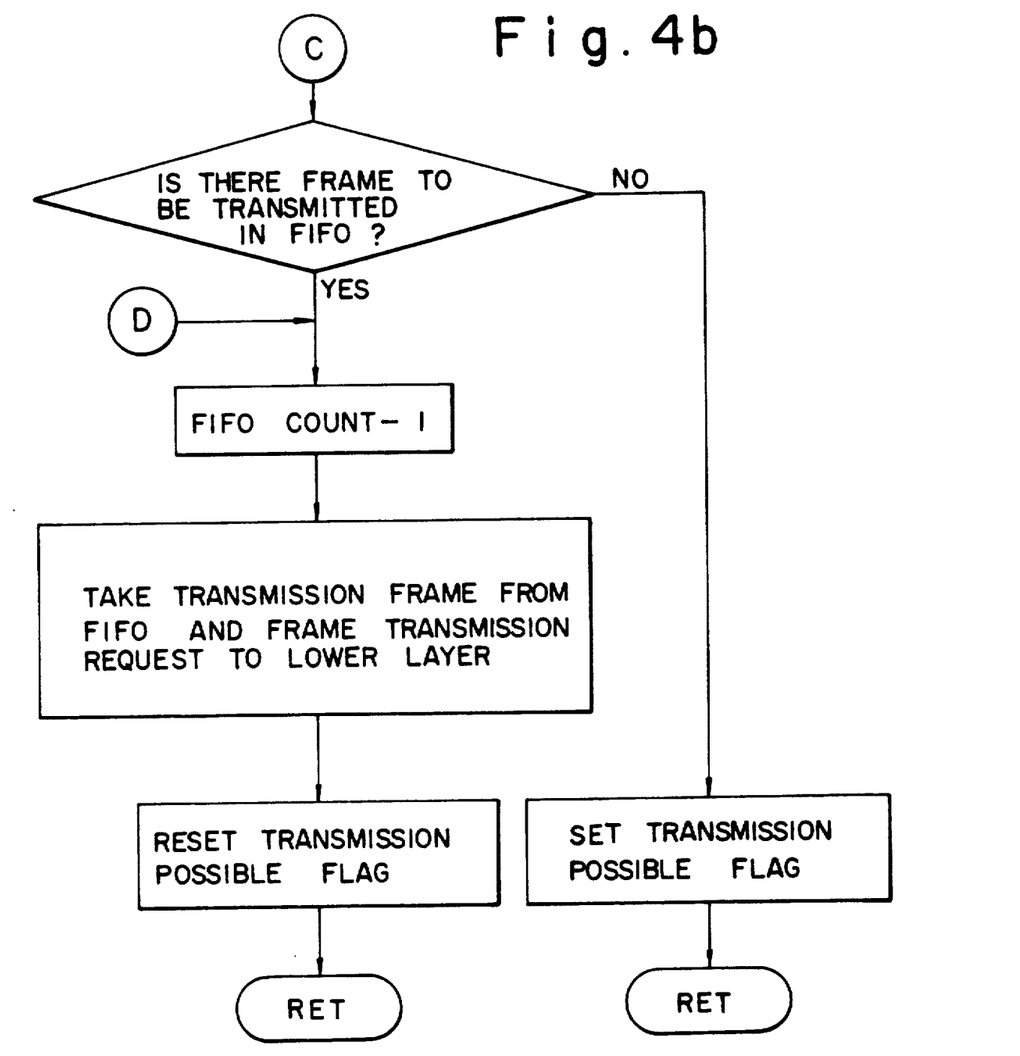
FIG. 4B shows a second portion of a flow chart illustrating in detail the steps in the image data transmission control flow for the Tx 3-1 portion which will be indicated later in the specification.
Figure 5:
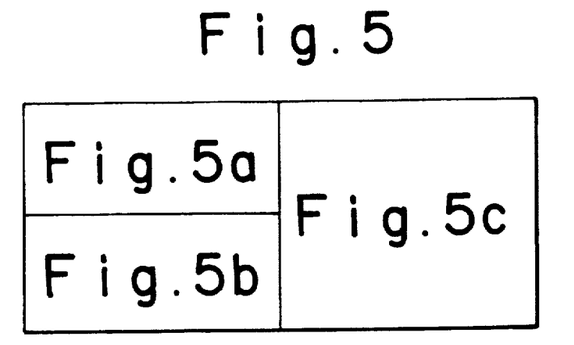
FIG. 5 shows how FIGS. 5a, 5b and 5c should be combined.

FIGS. 4a and 4b, when combined as illustrated in FIG. 4, shows the sequence of steps in controlling the transmission of image data in detail, which corresponds to the portion of Tx3-1 indicated in the above table. On the other hand, FIGS. 5a through 5c, when combined as illustrated in FIG. 5, show the sequence of steps in transferring image data from the buffer memory 13 to the flow buffer 15 including a plurality of memory block units 16, operating with the background of image data transmission control.

1) In the case of FIGS. 4a and 4b, upon completion of transmission of the preceding frame, the lower layer apprises of the condition of the next frame transmission possible. With this, it becomes possible to transmit the next frame.

Figure 5A:
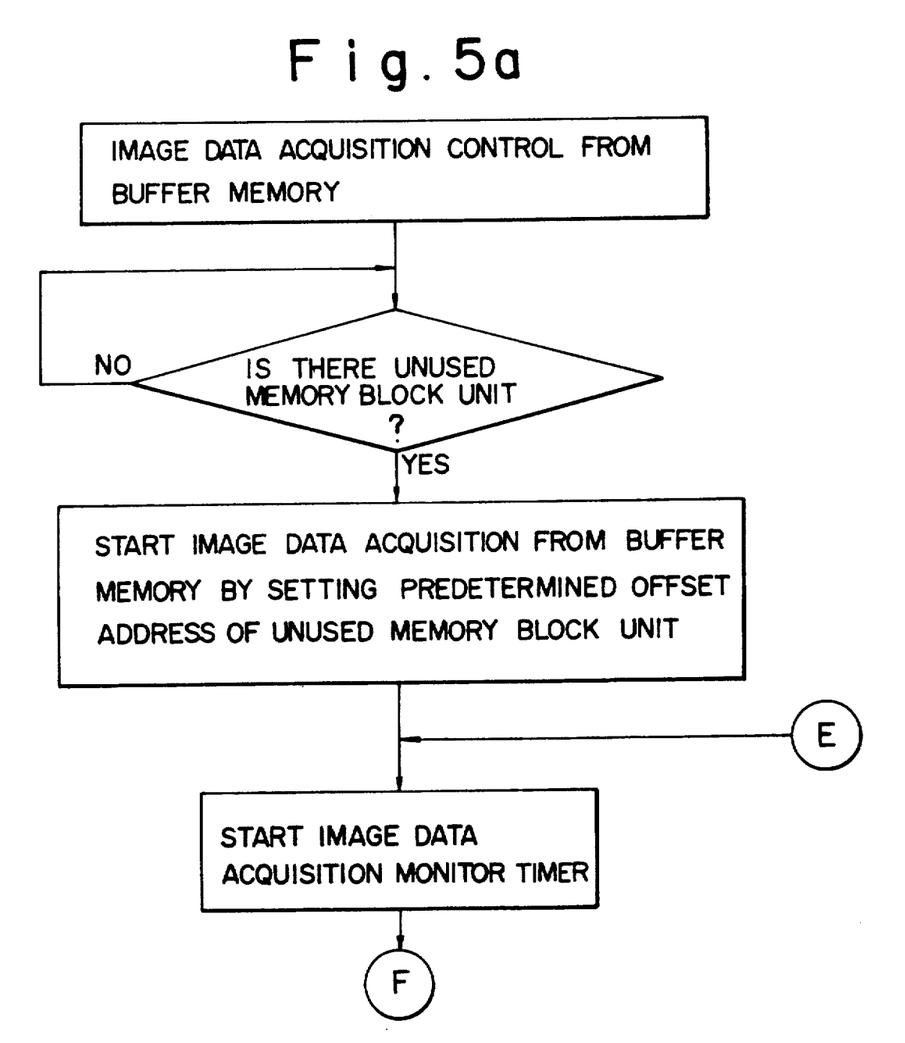
FIGS. 5a, 5b and 5c, when combined as illustrated in FIG. 5, show a flow chart illustrating the steps in the flow of transferring image data from the buffer memory, which operates under the background of image data transmission control, to the flow buffer.
Figure 5B:
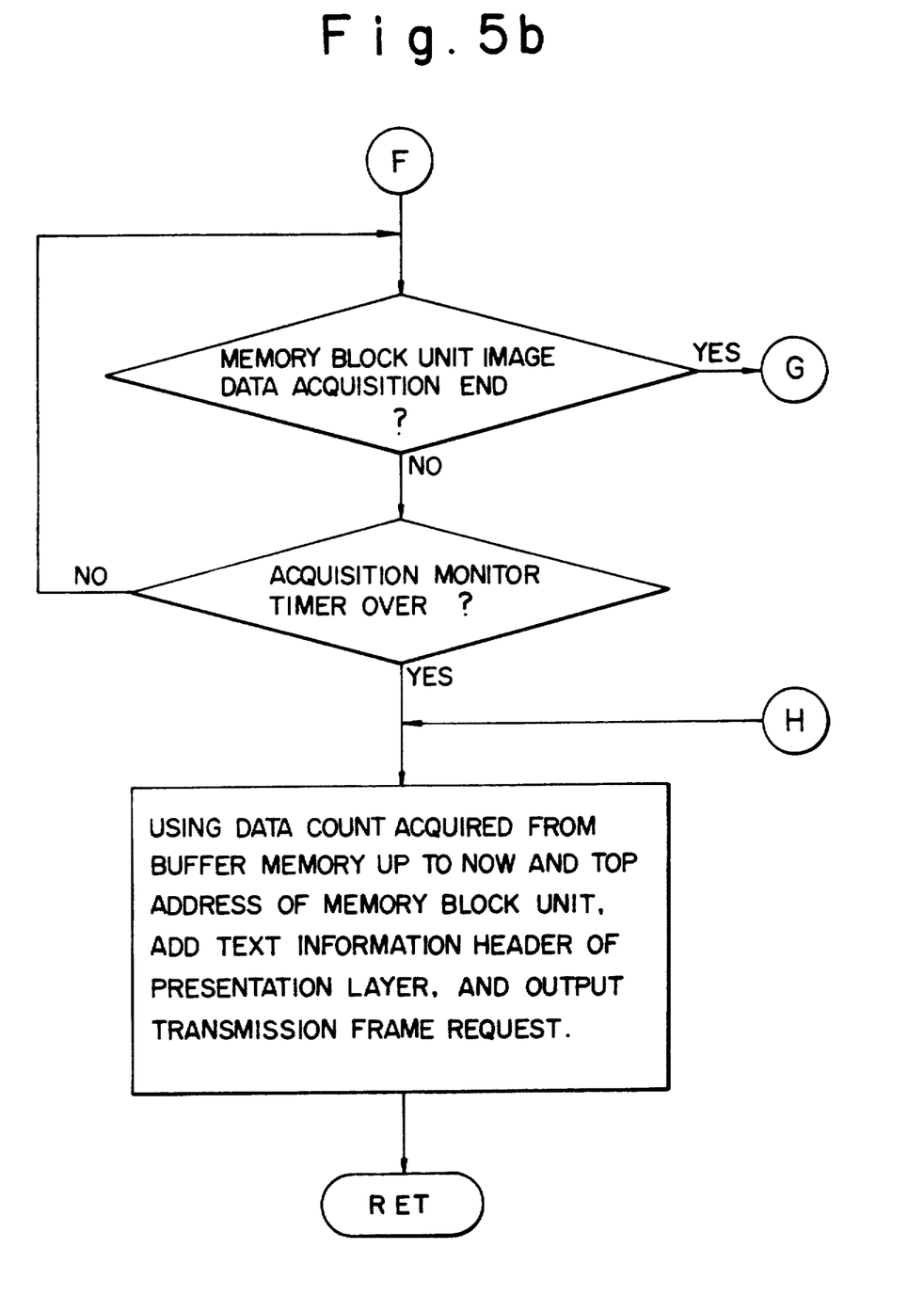
Figure 5C:
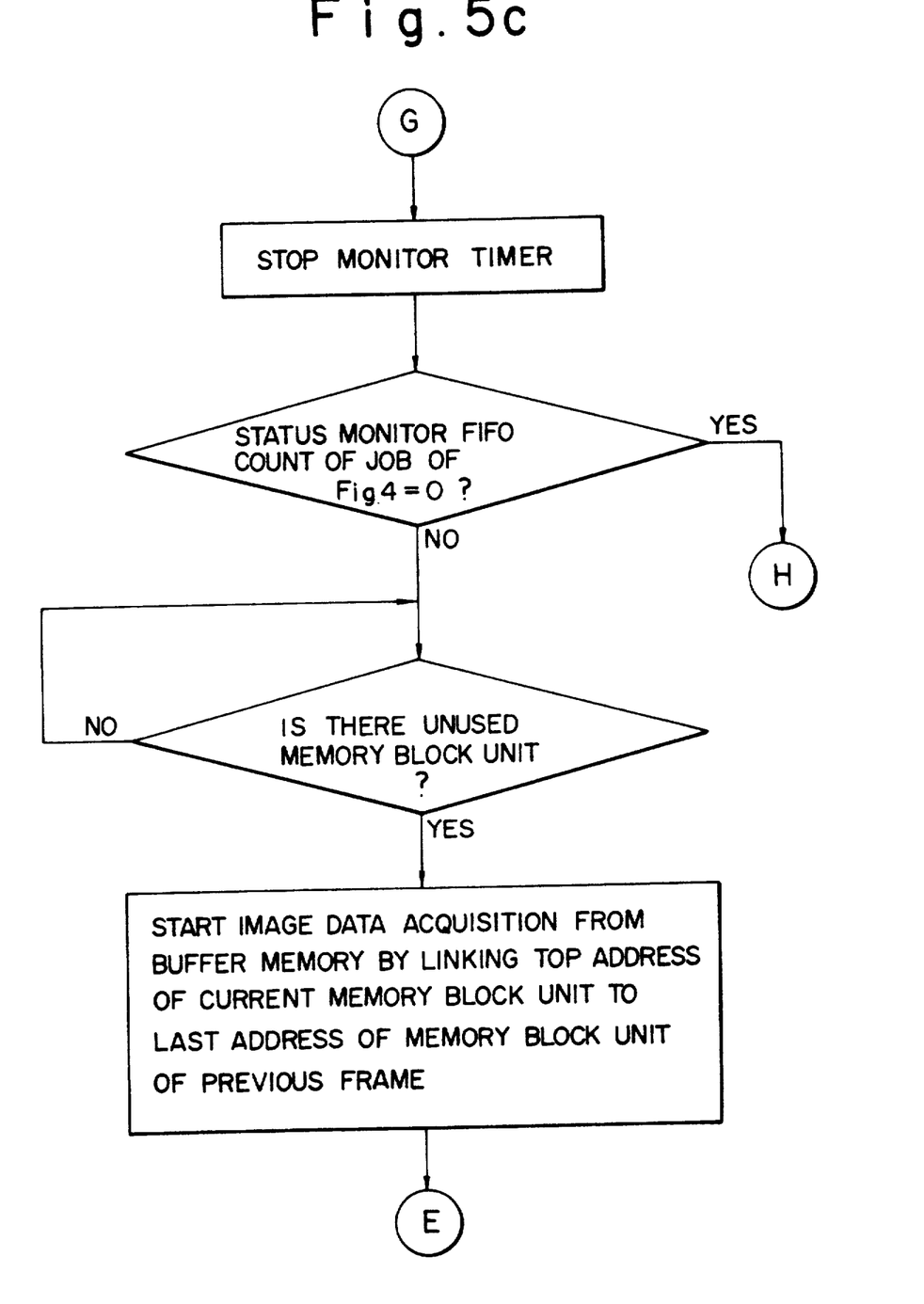

2) In the case if there is an apprisal of the next frame transmission request (REQ) from the flow shown in FIGS. 5a through 5c, then the information of this frame (frame count and frame address (memory block unit address)) is once stored into a FIFO buffer.

In addition, the FIFO counter is incremented at this time. And, if the next frame transmission possible of 1) has already arrived up to this point in time, then the information of frame to be transmitted is taken out of the FIFO area and transmitted to the lower layer. In addition, the FIFO counter is decremented at this time. Furthermore, a transmission possible flag is reset. This FIFO counter is referred to in the flow shown in FIGS. 5a through 5c, and it is used in deciding whether or not the memory block units 16 are to be linked or not.

3) If frame information to be transmitted already resides in the FIFO area by 2) at the time when the transmission possible signal has arrived from the lower layer, there is supplied a frame transmission request to the lower layer as set forth in the latter half of 2) above. If a frame to be transmitted does not exist in the FIFO area, the transmission possible flag is set and waits for the condition of 2).

4) In the flow shown in FIGS. 5a through 5c, this job is initiated after transmission of command document start, and the encoded data is transferred from the buffer memory 13 to the memory block unit 16. That is, if there is any unused area in the memory block unit 16, image data is transferred into this area from the buffer memory 13 using direct memory access (DMA) transfer as actual hardware.

When this transfer of image data is initiated, the memory block unit 16 hardly becomes full in such a case of an original having a small number of encoded bits. For this reason, in consideration of this time loss, this is monitored by an appropriate timer, even if the memory block unit 16 does not become full, in the case of T/0, the data so far accumulated in the memory block unit 16 is apprised to the flow shown in FIGS. 4a and 4b as a frame transmission request. In the case of absence of T/O and thus when the memory block unit 16 has been filled with image data, the condition of the flow shown in FIGS. 4a and 4b is examined by the FIFO counter, and if a frame to be transmitted to the FIFO area exists in the flow shown in FIGS. 4a and 4b, i.e., FIFO counter being not equal to 0, then the memory block unit 16 is linked to the next memory block unit 16 and the transfer of image data from the buffer memory 13 is again carried out.

That is, in this case, a transmission frame request is defined as a large clump of image data. In actuality, it is not linked indefinitely, and a limitation is imposed, for example, depending on the number of memory block units 16 used. This case arises when the other terminal is in the busy state as described before or when image information large in number of encoded bits occurred during transmission of the previous frame.

Regarding the timer value, the value determined in consideration of the count number of the frame (number of bytes) which issued the previous transmission request and the speed of the transmission line is used. That is, if the previously transmitted frame count is m bytes, then the timer value is preferably set at $(m \times 8)/f$, where f has a unit of kb/s indicating the speed of the transmission line.

As described above, in accordance with the present invention, transmission is carried out by taking into account the condition of accumulation of image data in the flow buffer 15 and/or the speed of production of encoded data and the speed of transferring the image data to the transmission line 8, the data frame can be controlled to be optimized in length, thereby allowing to enhance the overall transmission efficiency. It is to be noted that, in the above-described embodiment, function division was effected between the system control unit SCU and the communication control unit CCU; however, it is also possible that the function of CCU is incorporated into SCU, if desired. In this case, since the function of the presentation layer is incorporated into SCU, the functions of the buffer memory 13 and the flow buffer 15 may be handled as one unit. In other words, it is only necessary to consider the functions of the buffer memory 13 and the flow buffer 15 logically.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for controlling transmission of image data in a form of a frame by a telematic terminal including reading means for optically reading an original to be transmitted, first storing means for storing image data supplied from said reading means, second storing means for storing said image data after encoding said image data, third storing means for storing said coded image data in a form of a frame, transmitting means for transmitting said frame in said third storing means to a receiver at a remote location, and controlling means for controlling each of said means, said method comprising the steps of:

periodically detecting by a detecting means a degree and accumulation of image data in said third storing means; and varying a length of a frame to be transmitted formed in said third storing means depending on the degree of accumulation of said image data in said third storing means detected by said detecting means.

2. The method of claim 1, wherein said first storing means includes a line buffer memory and said third storing means includes a flow buffer memory.

3. The method of claim 2, wherein said flow buffer includes a plurality of memory block units, each of which has a predetermined number of bits of data to be stored, and wherein if said image data cannot be stored into one of said plurality of memory block units, then said image data is stored into two or more of said plurality of memory block units as linked.

* * * * *